United States Patent Office 2,952,545
Patented Sept. 13, 1960

2,952,545

BAKING AIDS AND USE OF SAME

Otto Pfrengle and Christel Pietruck, Budenheim (Rhine), Germany

No Drawing. Filed Jan. 9, 1958, Ser. No. 707,849

10 Claims. (Cl. 99—15)

This invention relates to baking aids, the method of forming same, and their use.

It is well known that lecithin as well as fatty acid mono- and diglycerides will improve the baking properties of gluten-poor wheat flours. As these materials are present in the form of oils or of waxy or pasty masses, they cannot be easily incorporated into the flour improving or flour raising ingredients of commerce which are generally in the form of powders. It is therefore necessary to stir these into the dough at the moment the dough is actually prepared, i.e., together with the fat. In order to facilitate the introduction of the lecithin into the dough it is known in the prior art that phosphatides may be worked up with alkaline reacting alkali salts, such as alkali phosphates, and in this way produce masses which can be cut with a knife.

It has now been found that one may transfer the lecithin or the glycerides into a powder form, if one precipitates them upon a powdery material which can be used for baking and which has a large surface. The flour per se is unsuitable for this, because it will not remain powdery if one adds oils or wax-like matter to a small amount of baking flour. Coating the flour in toto with such materials inside a mill would be impractical; it is much better to bind those ingredients to something which is then added to the flour in rather small amounts only. Calcium carbonate is known as a carrier, but since it is a filler only, it overloads the flour; the use of calcium carbonate is thus not preferred. Powdered milk is also known as such a carrier, but it spoils rather easily.

The present invention includes a process for the production of baking aids for this purpose whereby the calcium salts of orthophosphoric acids as well as polyphosphoric acids are used; these calcium salts should be in a light, fluffy or voluminous form, i.e., they have a large surface. It is possible, in this way, to use only small amounts of these calcium phosphates to pick up the needed amounts of glycerides or lecithin; the calcium phosphates thus treated remain as dry powders which can be shaken and poured. These powders are used as is, or mixed with other powdery ingredients which are used as aids and auxiliaries in the baking industry. When we refer to light, voluminous calcium phosphates, we mean those which show an apparent specific gravity (upon pouring) of less than 600 grams per liter, but preferably less than 400 grams per liter.

Especially suitable for the purposes of the invention are the di- and tricalcium orthophosphates, which are prepared by precipitation from dilute aqueous solutions (e.g., by slowly stirring together slaked lime with H$_3$PO$_4$ in dilute solution at temperatures up to 70° C., but preferably at room temperature, filtering, drying at 100° to 300° C., grinding, and shifting). "Dilute solutions" herein refer to those which have 1% to 25%, but preferably 5% to 15% solids. The condensed calcium phosphates, especially the straight-chain polyphosphates starting with pyrophosphate, may be prepared in voluminous form under the proper conditions by a double reaction of polyphosphoric acid or alkalipolyphosphates with soluble calcium salts. Especially suitable voluminous phosphates, for the purpose of the present invention, may be prepared by the heating of acid or weakly acidic calcium orthophosphates to temperatures at which the orthophosphate in part or in toto transforms into pyrophosphate, or into a mixture of polyphosphates, and subsequently grinding and, if needed, sifting.

This invention may be accomplished by applying the lecithin or the fatty acid mono- and diglycerides upon the phosphate by spraying. The lecithin preferably is diluted for this purpose with an easily volatile solvent, such as ethyl ether, to facilitate spraying. One may also melt it together with a mono- or diglyceride, and this mixed melt, just as the mono- or diglyceride by itself, can easily be sprayed in the hot state.

One needs, calculated on the base of 100 grams of flour, from 0.1 to 1 gram, but preferably from 0.15 to 0.5 gram, of calcium phosphate in order to pick up the needed amount of active ingredient. In this form, the resulting mixture can be easily incorporated into the flour either in the mill or immediately preceding the preparation of the dough.

The light calcium phosphates are not used solely for the purpose of picking-up oily materials. Calcium phosphates are also mineral foods which are needed for sustaining life; they are actually present in flour naturally, and it is indeed physiologically desirable to raise the amount thereof in bakery goods.

The amounts of lecithin or glycerides needed for the improvement of the dough properties fall within 0.05 to 0.8 gram, preferably between 0.1 to 0.4 gram, calulated for 100 grams of flour. By the addition of these new kinds of additives one does not only bring about a noticeable increase of the volume of the baked ware, but also a finer and more uniform pore formation. Depending upon the kind of the flour or of the dough preparation used, one produces by working according to the present invention an increase in the dough properties; this effect is more than simply an additive one.

In general, it should be noted that with the new preparations, which provide easier handling and formulation, one gets at least the same volume increase that would be produced by the separate application of the baking aids. Generally however, the volume increase is greater than could be obtained by the separate application of the phosphate and of lecithin, or the glyceride.

In the experiments described in Examples 1 and 2, infra, we used 80 grams of flour, 2 grams of yeast, 0.8 gram of NaCl, 44 cc. of H$_2$O, 0.25% calcium phosphate, and 0.2% lecithin or a mixture of lecithin with a fatty acid monoglyceride (herein referred to as the "mixture"). In Examples 1 and 2 calcium phosphate was either added to the flour and the lecithin, or the mixture was separately added to the dough. Alternatively, the lecithin, diluted with ethyl ether, was sprayed at room temperature or the mixture, without addition of solvent, was sprayed at 80° to 90° C. upon the calcium phosphate; the dried powder prepared this way was added to the flour.

The calcium phosphates used were as follows:

Phosphate "A" was a tricalcium phosphate of the hydroxylapatite type, precipitated, dried at 220° C. and sieved to an average flour fineness (12% coarser than sieve 30 and 24% coarser than sieve 60), with an apparent specific gravity upon loose pouring of 290 grams per liter.

Phosphate "B" also was precipitated and was a tricalcium phosphate of the hydroxylapatite type. It was dried at 250° C., then ground in a mill with high r.p.m.

to extreme fineness (0% on sieve 30 and 16.5% on sieve 60), with a loosely measured apparent specific gravity (i.e., after loose pouring and without tamping) of 258 grams per liter.

Phosphate "C" consists of 36% orthophosphate, 51% pyrophosphate, and 13% calcium polyphosphates of medium chain lengths. The ratio of Ca:P is 1.4:1, the apparent specific gravity is 560 grams per liter. It was prepared by mixing slaked lime and phosphoric acid in a high-power mixer, followed by a heating of the orthophosphate prepared this way in a rotating tubular furnace to 250° C. and subsequently grinding the heated product in a mill of high r.p.m. Forty percent of this phosphate was insoluble in water.

EXAMPLE I

Baking experiments were conducted in the course of two weeks with an untreated wheat flour of the type 550. The following control values (i.e., volume of baked products without phosphates, lecithin, or mixture) were obtained: 259 cc., 261 cc., 251 cc., 247 cc., 267 cc., 271 cc., 261 cc., 261 cc., 257 cc., and 273 cc. The average value was 261 cc. In the various experiments wherein the individual values deviate from the average, the accepted control value was the average difference in the experiment in question between the individual control value and 261 cc. In the following experimental results, one uses therefore the average from the volume yields obtained, and the control value of the experiments is subtracted; this is the volume increase as stated. The parentheses will always contain the individual values.

With the phosphate "A," the addition of this phosphate by itself, without lecithin or the mixture, produced a volume increase of 6 cc. (265 cc., 267 cc., and 269 cc.). If one omits the phosphate and adds lecithin to the dough, then the addition is 25 cc. (283 cc., 287 cc., 289 cc.). If the total flour is sprayed with lecithin, then the addition was 29 cc. (volume increase) (284 cc., 289 cc., 291 cc., 295 cc.). If the phosphate "A" is however sprayed with lecithin and if this product "A₁" is added to the flour, then the addition in volume would be 30 cc. (291 cc., 291 cc.). In this preparation using "A₁," 0.45% was added, i.e., 0.25% "A" and 0.2% lecithin. The apparent specific gravity (bulk weight) was 541 grams per liter.

The relations were much improved when the mixture was used. This mixture alone, without the phosphate, caused a volume increase of 16 cc. (277 cc., 277 cc.). If one sprays onto the flour 0.2% of the mixture, without any phosphate, the volume increase would be 36 cc. (283 cc., 291 cc.). The phosphate and the mixture added to flour or dough, separately without premixing, brought about a volume increase of 26 cc. (285 cc., 289 cc.). The phosphate sprayed with the mixture, when 0.45% of this preparation "A₂" was added (i.e., 0.25% "A" plus 0.2% mixture), caused an increase of 41 cc. (301 cc., 303 cc.). The product "A₂" had a bulk weight of 350 grams per liter.

The phosphate "B" alone produced an improvement of 21 cc. (280 cc., 281 cc., 291 cc.). If in addition, 0.2% lecithin were added to the dough, then the increase was 38 cc. (303 cc., 303 cc., 307 cc.). If, however, the phosphate was sprayed with lecithin and the preparation "B₁" added in the amount of 0.45% to the flour, then the volume increase was 46 cc. (295 cc., 309 cc., 317 cc.). The bulk weight of "B₁" was 445 grams per liter.

The phosphate "C" alone did not cause any volume increase. 0.25% phosphate "C" and 0.2% of the mixture, used separately in the application, brought about a volume increase of 22 cc. (275 cc., 283 cc., 285 cc.). The phosphate "C," after the mixture had been sprayed upon it (furnishing preparation "C₂"), now caused an increase of 45 cc. (309 cc., 313 cc., 313 cc.). 0.45% "C₂" was applied, i.e., 0.25 "C" plus 0.2% mixture.

EXAMPLE II

The following baking experiments were undertaken with untreated wheat flour of the type 1050.

With 0.2% lecithin alone, no increase of the bread volume was noted (200 cc., 243 cc., 227 cc., 211 cc.). With 0.25% phosphate "A," the volume increase was 21 cc. (245 cc., 245 cc., 235 cc.) compared to the control value of 220 cc. (223 cc., 219 cc., 219 cc.). A separate addition of 0.2% lecithin and 0.25% phosphate "A" resulted in an increase of 32 cc. (259 cc., 249 cc., 247 cc.), whereas the phosphate sprayed with lecithin to give "A" (0.45%, i.e., 0.25% "A" plus 0.2% lecithin), caused a volume increase of 40 cc. (259 cc., 267 cc., 255 cc.).

The phosphate "B" furnished, compared to the control value of 219 cc. (225 cc., 207 cc., 225 cc.), with an addition of 0.25%, a volume increase of 18 cc. (241 cc., 237 cc., 233 cc.); if 0.25% "B" and 0.2% lecithin were mixed-in separately, the volume increase was 22 cc. (243 cc., 229 cc., 252 cc.). 0.45% of the phosphate "B₁" sprayed with lecithin onto it, i.e., 0.25% "B" plus 0.2% lecithin, caused a volume increase of 41 cc. (259 cc., 261 cc., 261 cc.), i.e., about 19% above the control value.

EXAMPLE III

In the following Examples III to V, the calcium phosphate "C" was used. "C₁" is the same phosphate, but 2.5 parts thereof were sprayed with 2 parts of lecithin. "C₂" is the same phosphate sprayed with the mixture.

First, we ran a series with untreated wheat flour of the type 550. At normal dough consistency, a fermentation time of 55 minutes, and a dough yield of 155 to 156 grams, the following results were obtained:

*Table I*

|  | Control | 0.25% "C" | 0.35% "C₁" | 0.35% "C₂" |
| --- | --- | --- | --- | --- |
| Bread yield | 129 | 130 | 131 | 131. |
| Loss upon full baking | 16.3 | 15.8 | 15.2 | 15.5. |
| Crumb texture | somewhat coarse. | somewhat coarse. | almost tender. | almost tender. |
| Crumb elasticity | good | good | good | good. |
| Pore homogeneity | pretty uniform | pretty uniform. | uniform | uniform. |
| Pore picture | 4–5 | 5 | 7–8 | 7–8. |
| Taste | correct | correct | correct | correct. |
| Volume yield | 452 | 432 | 478 | 484. |
| Baking number | 82 | 81 | 132 | 135. |
| Evaluation number | 92 | 91 | 152 | 155. |

EXAMPLE IV

In the next series of experiments we used an untreated wheat flour of the type 1050. At normal dough texture, a fermentation time of 60 minutes, and a dough yield of 160, we found:

*Table II*

|  | Control | 0.25% "C" | 0.35% "C₁" | 0.35% "C₂" |
| --- | --- | --- | --- | --- |
| Bread yield | 134 | 136 | 135 | 134. |
| Loss upon full baking | 15.8 | 14.6 | 15.0 | 15.6. |
| Crumb texture | somewhat coarse. | somewhat coarse. | somewhat coarse. | almost tender. |
| Crumb elasticity | good | good | good | good. |
| Pore homogeneity | pretty uniform. | pretty uniform. | uniform | uniform. |
| Pore picture | 4–5 | 5 | 7 | 7. |
| Taste | correct | correct | correct | correct. |
| Volume yield | 468 | 460 | 510 | 506. |
| Baking number | 87 | 91 | 140 | 138. |
| Evaluation number | 97 | 101 | 155 | 153. |

EXAMPLE V

Another experimental series was run with a wheat flour of the type 550, which had been treated in the mill in the usual way. At normal dough consistency, a fermentation time of 60 minutes and a dough yield of 163–164, we found:

Table III

| | Control | 0.25% "C" | 0.35% "C₁" | 0.35% "C₂" |
|---|---|---|---|---|
| Bread yield | 136 | 137 | 134 | 135. |
| Baking loss at full baking | 16.6 | 16.4 | 17.8 | 17.4. |
| Crumb consistency | almost tender | tender | tender | tender. |
| Crumb elasticity | good | good | good | good. |
| Pore homogeneity | pretty uniform | pretty uniform | pretty uniform | pretty uniform. |
| Pore picture | 6-7 | 6-7 | 7 | 7-8. |
| Taste | correct | correct | correct | correct. |
| Volume yield | 480 | 486 | 502 | 502. |
| Baking value | 119 | 122 | 136 | 143. |
| Evaluation number | 134 | 142 | 156 | 163. |

It can be seen, from the above data, that the products of our invention bring about a significant quality improvement of the baked goods even if one uses the commercial flours which are treated with $KBrO_3$.

Finally, we undertook an experimental series with the rye flour of the type 997. Here, the agents "$C_1$" and "$C_2$" loosened the dough somewhat. The acidity of the bread increased a little bit.

In summary we may say that the baking aid ingredients according to the invention will bring about in wheat flour a significant improvement not only of the volume yield, but also with respect to pore homogeneity and crumb texture of the bread. The increase of bread quality is much higher than the one produced with the aid of the ordinarily used oxidants.

It is obvious that the baking aids prepared according to the present invention can be used in mixture with already known agents, like malt flour, ascorbic acid, and inorganic mineral matters.

The term "calcium phosphate" in the claims is intended to include the above-described calcium phosphate products which have been referred to as being suitable for the purposes of our invention. Thus, this term is intended to be generic in scope and not restricted to a single product.

The foregoing detailed description has been given for clearness of understanding only, and no unnecessary limitations should be understood therefrom, as modifications will be obvious to those skilled in the art.

We claim:

1. A solid baking aid composition suitable for use with comestible baking flours, which comprises light and fluffy calcium phosphate particles having a bulk weight of less than 600 grams/liter, and a glyceride baking aid bonded to said phosphate particles.

2. A solid, free-flowing baking aid composition suitable for use with comestible baking flours, said composition having the property of improving at least one of the following characteristics of baked flour: increased volume, finer pores, and more uniform pore formation, said composition comprising light and fluffy calcium phosphate particles having a bulk weight of less than 600 grams/liter and a glyceride baking aid bonded to said phosphate particles.

3. The method of forming a baking composition, which comprises bonding a glyceride baking aid to calcium phosphate particles having a bulk weight of less than 600 grams/liter, thereby forming a free-flowing, solid product and enabling said phosphate particles to serve as a carrier for the glyceride constituent.

4. A composition suitable for baking, which comprises a major proportion of comestible flour, and a solid, free-flowing baking aid product comprising light and fluffy calcium phosphate particles having a bulk weight of less than 600 grams/liter and a glyceride baking aid bonded to said phosphate particles.

5. The composition of claim 4 wherein the glyceride is lecithin.

6. A composition suitable for baking purposes, which comprises 100 parts by weight of comestible flour, 0.1-1 part by weight light and fluffy calcium phosphate particles having a bulk weight of less than 600 grams/liter, and 0.05-0.8 part by weight of a glyceride baking aid bonded to said phosphate particles.

7. The composition of claim 1 wherein the baking aid contains lecithin.

8. The composition of claim 2 wherein the baking aid contains lecithin.

9. The method of claim 3 wherein the baking aid contains lecithin.

10. The composition of claim 6 wherein the baking aid contains lecithin.

References Cited in the file of this patent

UNITED STATES PATENTS

| | | |
|---|---|---|
| 2,158,589 | Penn | May 16, 1939 |
| 2,334,401 | Fitzpatrick et al. | Nov. 16, 1943 |
| 2,444,984 | Fitzpatrick | July 13, 1948 |

FOREIGN PATENTS

| | | |
|---|---|---|
| 503,476 | Great Britain | Mar. 30, 1939 |
| 518,103 | Great Britain | Feb. 16, 1940 |